United States Patent
Hung et al.

(10) Patent No.: US 12,217,332 B2
(45) Date of Patent: Feb. 4, 2025

(54) COORDINATE GENERATION SYSTEM, COORDINATE GENERATION METHOD, AND COMPUTER READABLE RECORDING MEDIUM WITH STORED PROGRAM

(71) Applicant: REALTEK SEMICONDUCTOR CORP., Hsinchu (TW)

(72) Inventors: Yu-Hsuan Hung, Hsinchu (TW); Chun-Fu Liao, Hsinchu (TW); Kai-Ting Shr, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 117 days.

(21) Appl. No.: 18/097,795

(22) Filed: Jan. 17, 2023

(65) Prior Publication Data

US 2024/0153154 A1 May 9, 2024

(30) Foreign Application Priority Data

Nov. 1, 2022 (TW) .................................. 111141690

(51) Int. Cl.
*G06T 11/00* (2006.01)
*G06T 3/60* (2024.01)

(52) U.S. Cl.
CPC ................ *G06T 11/00* (2013.01); *G06T 3/60* (2013.01)

(58) Field of Classification Search
CPC . G06T 11/00; G06T 17/20; G06T 7/60; G06T 15/20; G06T 2207/20084; G06T 17/00; G06T 3/60; G06N 3/0464
See application file for complete search history.

(56) References Cited

U.S. PATENT DOCUMENTS

| 11,282,255 | B2 * | 3/2022 | Kuribayashi | ........... G06T 13/40 |
| 11,868,515 | B2 * | 1/2024 | Kuribayashi | ............. G06T 7/75 |
| 2021/0241510 | A1 * | 8/2021 | Kuribayashi | ........... G06T 15/04 |
| 2023/0012372 | A1 * | 1/2023 | Saha | .................... G06N 3/0464 |

FOREIGN PATENT DOCUMENTS

| TW | 200823689 A | 6/2008 |
| TW | 202224423 A | 6/2022 |

* cited by examiner

*Primary Examiner* — Vijay Shankar
(74) *Attorney, Agent, or Firm* — Birch, Stewart, Kolasch & Birch, LLP

(57) ABSTRACT

A coordinate generation system, a coordinate generation method, a computer readable recording medium with stored program, and a non-transitory computer program product are provided. The coordinate generation system includes processing units and a neural network module. The processing units are configured to obtain four vertex coordinates of an image. The vertex coordinates include first components and second components. The processing unit is configured to perform the following steps: obtaining first vector based on the first components of the four vertex coordinates and repeatedly concatenating the first vector so as to obtain a first input; obtaining second vector based on the second components of the four vertex coordinates and repeatedly concatenating the second vector so as to obtain a second input; and obtaining first output coordinate components and second output coordinate components of output coordinates based on the first input, the second input, and parameters of the neural network module.

15 Claims, 8 Drawing Sheets

COORDINATE GENERATION SYSTEM, COORDINATE GENERATION METHOD, AND COMPUTER READABLE RECORDING MEDIUM WITH STORED PROGRAM

CROSS-REFERENCE TO RELATED APPLICATION

This non-provisional application claims priority under 35 U.S.C. § 119(a) to Patent Application No. 111141690 filed in Taiwan, R.O.C. on Nov. 1, 2022, the entire contents of which are hereby incorporated by reference.

BACKGROUND

Technical Field

The instant disclosure is related to the field of image processing, especially the application of neural network to image processing technology.

Related Art

Image distortion correction techniques known to the inventor, such as deformation based on rotation, trapezoidal compensation, and stretching, utilize the four vertexes of an original image and the four vertexes of a target image to analyze simultaneous equations and interpolate coordinates of the other locations to illustrate the complete image. This method may require complex calculations to obtain the target image.

SUMMARY

As above, some embodiments of the instant disclosure provide a coordinate generation system, a coordinate generation method, a computer readable medium with stored program and a non-transitory computer program product to improve current technological issues.

An embodiment of the instant disclosure provides a coordinate generation system. The coordinate generation system comprises at least one processing unit and a neural network module. The at least one processing unit is configured to obtain four vertex coordinates of an image. Each of the four vertex coordinates of the image comprises a first component and a second component. The neural network module has a plurality of parameters. The at least one processing unit is configured to perform the following steps: obtaining a first vector based on the first component of each of the four vertex coordinates of the image and repeatedly concatenating the first vector so as to obtain a first input and obtaining a second vector based on the second component of each of the four vertex coordinates of the image and repeatedly concatenating the second vector so as to obtain a second input; and obtaining a plurality of first output coordinate components and a plurality of second output coordinate components of a plurality of output coordinates based on the first input, the second input, and the parameters.

An embodiment of the instant disclosure provides a coordinate generation method performed by at least one processing unit. The coordinate generation method comprises: obtaining four vertex coordinates of an image, wherein each of the four vertex coordinates of the image comprises a first component and a second component; obtaining a first vector based on the first component of each of the four vertex coordinates of the image and repeatedly concatenating the first vector so as to obtain a first input and obtaining a second vector based on the second component of each of the four vertex coordinates of the image and repeatedly concatenating the second vector so as to obtain a second input; and obtaining a plurality of first output coordinate components and a plurality of second output coordinate components of a plurality of output coordinates based on the first input, the second input, and a plurality of parameters of a neural network module.

The instant disclosure provides a computer readable recording medium with stored program and a non-transitory computer program product. When at least one processor loads and executes the stored program, the at least one processor executes the coordinate generation method.

As above, some embodiments of the instant disclosure provide a coordinate generation system, a coordinate generation method, a computer readable medium with stored program and a non-transitory computer program product. Based on a trained neural network, with just four vertexes of a target image, the coordinates of the other points of the target image can be obtained. Compared with image deformation techniques known to the inventor, which utilizes interpolation to calculate the corresponding coordinates, one or some embodiments of the instant disclosure adopt neural network to replace interpolation, and thus the overall calculation process can be simplified.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

The foregoing and other technical contents, features, and effects of the present invention can be clearly presented below in detailed description with reference to embodiments of the accompanying drawings. Any modification and change without affecting the effects and the objectives that can be achieved by the present invention should fall within the scope of the technical content disclosed by the present invention. In all of the drawings, identical symbols are used to denote identical or similar elements. In the following detailed description, the term "connect" may refer to any means of direct or indirect connection as well as wired or wireless connection. In the following detailed description and drawings, vector $$\begin{bmatrix} a \\ \vdots \\ b \end{bmatrix}$$

is sometimes expressed as (a, . . . , b), and thus the two expressions refer to the same idea.

Figure 1:
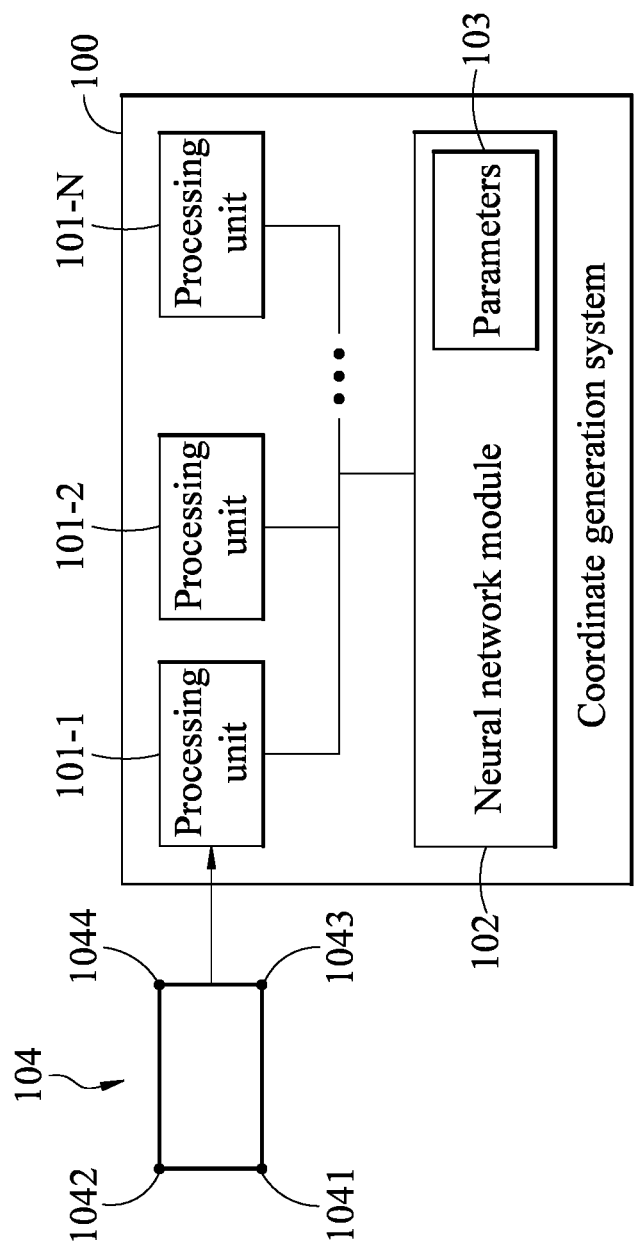
FIG. 1 illustrates a schematic block diagram of a coordinate generation system according to an embodiment of the instant disclosure.

FIG. 1 illustrates a schematic block diagram of a coordinate generation system according to an embodiment of the instant disclosure. Please refer to FIG. 1. The coordinate generation system 100 comprises processing units 101-1 through 101-N and a neural network module 102. N is a positive integer. In some embodiments, the value of N is 1, and thus the coordinate generation system 100 comprises just one processing unit 101-1. The neural network module 102 has a plurality of parameters 103. The parameters 103 are obtained through a training process. The processing units 101-1 through 101-N are configured to obtain vertex coordinates of four vertexes (the vertex 1041, the vertex 1042, the vertex 1043, and the vertex 1044) of an image 104. The image 104 is an image to be corrected. The processing units 101-1 through 101-N obtain the coordinate of each point of the image 104 according to the vertex coordinates of the four vertexes (the vertex 1041, the vertex 1042, the vertex 1043, and the vertex 1044) of the image 104 and the parameters 103 of the neural network module 102.

In some embodiments of the instant disclosure, the vertex coordinates of the four vertexes (the vertex 1041, the vertex 1042, the vertex 1043, and the vertex 1044) of the image 104 are presented using two-dimensional vectors. Each of the vertex coordinates of the four vertexes (the vertex 1041, the vertex 1042, the vertex 1043, and the vertex 1044) comprises a first component and a second component. For example, in some embodiments, the vertex coordinate of the vertex 1041 is (0,0), the vertex coordinate of the vertex 1042 is (0,15), the vertex coordinate of the vertex 1043 is (15,0), and the vertex coordinate of the vertex 1044 is (15,15). In this embodiment, the first component of the vertex 1041 is 0, and the second component of the vertex 1041 is 0. The first components and the second components of the vertex coordinates of the vertex 1042 through the vertex 1044 can be inferred this way. Besides, in some embodiments, the image 104 has 16×16=256 points.

The following will illustrate in detail the coordination generation method and the cooperation of each modules of the coordination generation system 100 according to some embodiments of the instant disclosure with the aid of the drawings.

Figure 6:
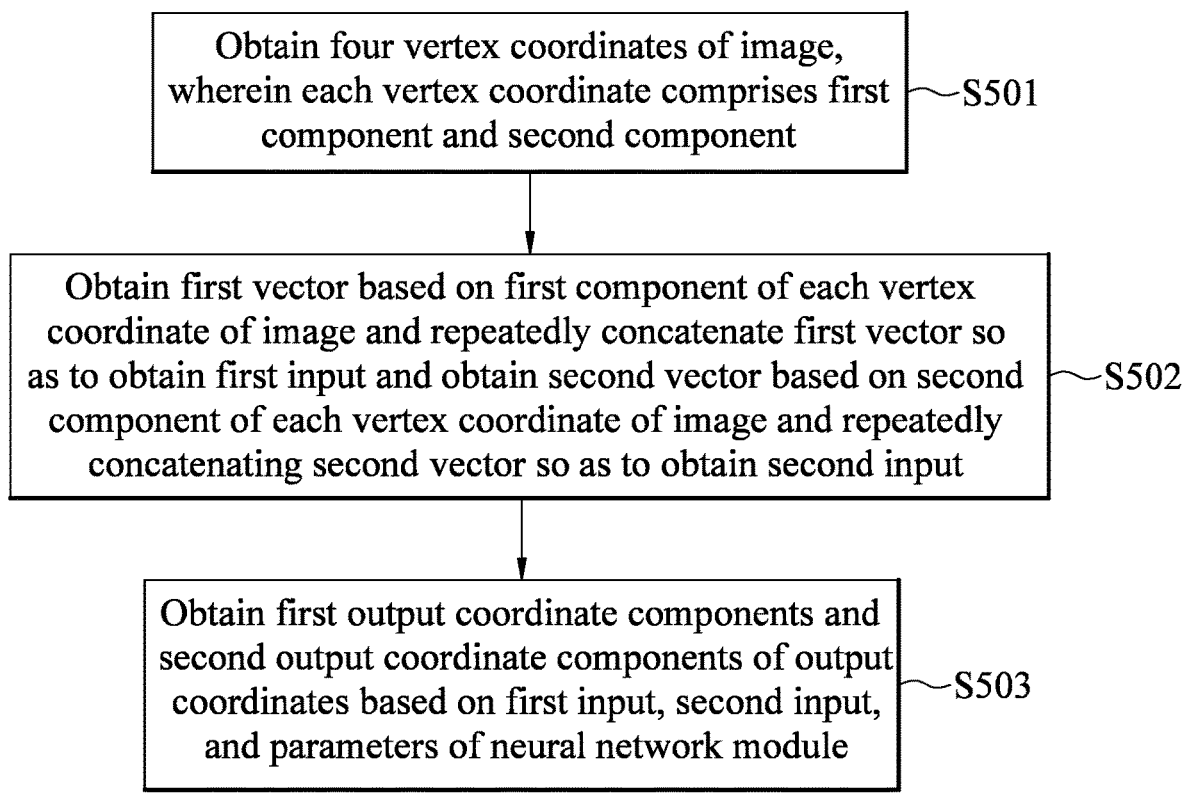
FIG. 6 illustrates a schematic flow chart of a coordinate generation method according to some embodiments of the instant disclosure.

FIG. 6 illustrates a schematic flow chart of a coordinate generation method according to some embodiments of the instant disclosure. Please refer to FIG. 1 and FIG. 6 at the same time. In the embodiment shown in FIG. 6, the processing units 101-1 through 101-N perform the steps S501-S503. In the step S501, the processing units 101-1 through 101-N obtain the vertex coordinates of the four vertexes (the vertex 1041, the vertex 1042, the vertex 1043 and the vertex 1044) of the image 104. Taking the aforementioned as an example, the vertex coordinate of the vertex 1041 is (0,0), the vertex coordinate of the vertex 1042 is (0,15), the vertex coordinate of the vertex 1043 is (15,0), and the vertex coordinate of the vertex 1044 is (15,15). Each of the vertex coordinates of the four vertexes (the vertex 1041, the vertex 1042, the vertex 1043, and the vertex 1044) comprises a first component and a second component.

In the step S502, the processing units 101-1 through 101-N obtain a first vector $k_x$ based on the first component of each of the vertex coordinates of the four vertexes (the vertex 1041, the vertex 1042, the vertex 1043, and the vertex 1044) of the image 104 and then repeatedly concatenate the first vector $k_x$ so as to obtain a first input $i_x$. The number of components of the first input $i_x$ is the number of the points of the image 104. Taking the aforementioned as an example, the first component of the vertex 1041 is 0, the first component of the vertex 1042 is 0, the first component of the vertex 1043 is 15, and the first component of the vertex 1044 is 15. Concatenating the first components of the vertex coordinates of the four vertexes of the image 104 yields the first vector $k_x$, and the first vector $k_x$ is expressed as (0,0,15,15). Then, the first vector $k_x$ is repeatedly concatenated to obtain the first input $i_x$. The number of components of the first input $i_x$ is equal to the number of the points of the image 104. The first input $i_x$ may be expressed as $i_x$= ($k_x$, $k_x$, . . . , $k_x$, . . . ), wherein, if the number of the points of the image 104 is not a multiple of four, the remaining components of $i_x$ will be sequentially filled with 0, 0, 15, 15. It is worth illustrating that, because each of the points of the image 104 corresponds to a pixel of the image 104, the number of the points of the image 104 is usually a multiple of four (for example, the image 104 has 16×16=256 points). When the number of the points of the image 104 is a multiple of four, the first input may be expressed as $i_x$=($k_x$, $k_x$, . . . , $k_x$).

Similarly, the processing units 101-1 through 101-N obtain a second vector $k_y$ based on the second component of each of the vertex coordinates of the four vertexes (the vertex 1041, the vertex 1042, the vertex 1043, and the vertex 1044) of the image 104 and then repeatedly concatenate the second vector $k_y$ so as to obtain a second input $i_y$. The number of components of the second input $i_y$ is the number of the points of the image 104. Taking the aforementioned as an example, the second vector $k_y$ is expressed as (0,15,0,15). Then, the second vector $k_y$ is repeatedly concatenated to obtain the second input $i_y$. The number of components of the second input $i_y$ is equal to the number of the points of the image 104. The second input $i_y$ may be expressed as $i_y$=($k_y$, $k_y$, . . . , $k_y$, . . . ), where, if the number of the points of the image 104 is not a multiple of four, the remaining components of $i_y$ will be sequentially filled with 0, 15, 0, 15.

In the step S503, the processing units 101-1 through 101-N take the first input $i_x$ and the second input $i_y$ as inputs of the neural network module 102, and thus the processing units 101-1 through 101-N obtain a plurality of first output coordinate components and a plurality of second output coordinate components of a plurality of output coordinates based on the first input $i_x$, the second input $i_y$, and the parameters 103 of the neural network module 102.

Figure 2:
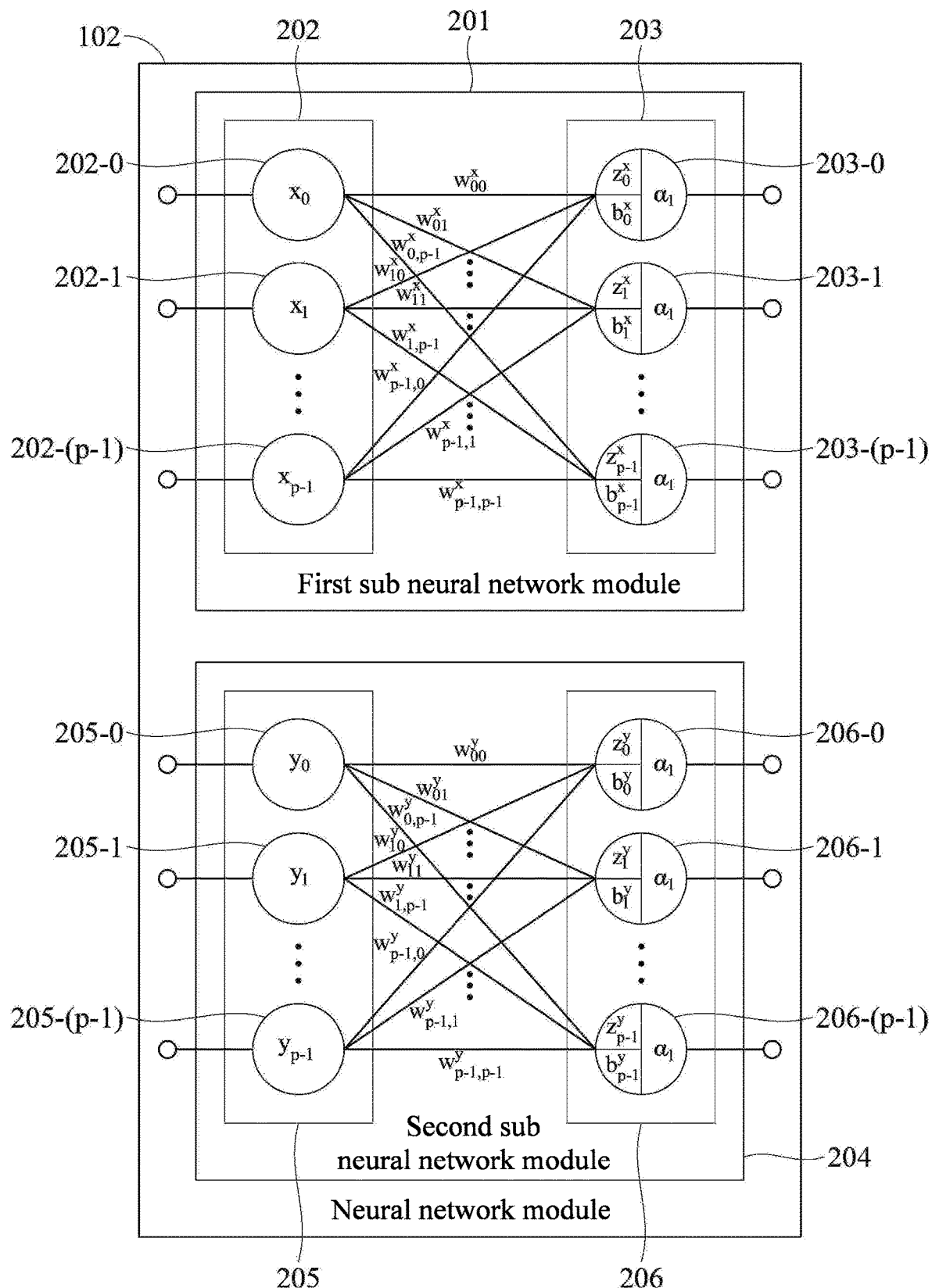
FIG. 2 illustrates a schematic diagram of a neural network module according to an embodiment of the instant disclosure.

FIG. 2 illustrates a schematic diagram of a neural network module according to an embodiment of the instant disclosure. Please refer to FIG. 2. In the embodiment shown in FIG. 2, the neural network module 102 comprises a first sub neural network module 201 and a second sub neural network module 204. The first sub neural network module 201 comprises a first layer 202 and a second layer 203. The first layer 202 is the input layer of the first sub neural network module 201, and the second layer 203 is the output layer of the first sub neural network module 201. The first layer 202 comprises neurons 202-1 through 202-($p$–1), and the second layer 203 comprises neurons 203-0 through 203-($p$–1).

The number p is the number of the points of the image 104. The input value obtained by the neuron 202-0 is $x_0$, the input value obtained by the neuron 202-1 is $x_1$, and the input value obtained by the neuron 202-($p$–1) is $x_{p-1}$. The first layer 202 and the second layer 203 are connected to each other through full connection, and each of the connections between the neurons of the first layer 202 and the neurons of the second layer 203 includes a weight. As shown in FIG. 2, these weights are $w_{00}^x$, $w_{01}^x$ ... $w_{0,p-1}^x$, $w_{10}^x$, $w_{11}^x$ ... $w_{1,p-1}^x$ ... $w_{p-1,0}^x$, $w_{p-1,1}^x$ ... $w_{p-1,p-1}^x$. Each of the neurons of the second layer 203 includes a bias, a weighting input, and an output. As shown in FIG. 2, the neuron 203-0 includes the bias $b_0^x$, the weighting input $z_0^x$, an activation function $a_1$, the neuron 203-1 includes the bias $b_1^x$, the weighting input $z_1^x$, the activation function $a_1$, the neuron 203-($p$–1) includes the bias $b_{p-1}^x$, the weighting input $z_{p-1}^x$, the activation function $a_1$, and so on. The weighting input is $z_0^x$ the weighted sum of the neuron inputs of the first layer 202 based on the weights and the biases, as shown below:

$$z_0^x = w_{00}^x x_0 + w_{10}^x x_1 + \ldots + w_{p-1,0}^x x_{p-1} + b_0^x.$$

The output of the neuron 203-0 is $a_1(z_0^x)$. In this embodiment, $a_1(z_0^x) = \sigma \cdot z_0^x$, where a is a preset constant. The weighting inputs $z_1^x \ldots z_{p-1}^x$ of the neurons 203-1 through 203-($p$–1) and the outputs of the neurons 203-1 through 203-($p$–1) can be inferred in the same way.

The weights $w_{00}^x$, $w_{01}^x$ ... $w_{0,p-1}^x$, $w_{10}^x$, $w_{11}^x$ ... $w_{1,p-1}^x$ ... $w_{p-1,0}^x$, $w_{p-1,1}^x$ ... $w_{p-1,p-1}^x$ and biases $b_0^x$, $b_1^x$ ... $b_{p-1}^x$ are referred to as first sub parameters, and the connection relationship between the first layer 202 and the second layer 203 is referred to as "the first layer 202 and the second layer 203 are connected to each other through full connection based on the first sub parameters."

Similarly, the second sub neural network module 204 comprises a third layer 205 and a fourth layer 206. The second layer 205 is the input layer of the second sub neural network module 204, and the fourth layer 206 is the output layer of the second sub neural network module 204. The third layer 205 comprises neurons 205-1 through 205-($p$–1), and the fourth layer 206 comprises neurons 206-0 through 206-($p$–1). The input value obtained by the neuron 205-0 is $y_0$, the input value obtained by the neuron 205-1 is $y_1$, and the input value obtained by the neuron 205-($p$–1) is $y_{p-1}$. The third layer 205 and the fourth layer 206 are connected to each other through full connection, and each of the connections between the neurons of the third layer 205 and the neurons of the fourth layer 206 includes a weight. As shown in FIG. 2, these weights are $w_{00}^y$, $w_{01}^y$ ... $w_{0,p-1}^y$, $w_{10}^y$, $w_{11}^y$ ... $w_{1,p-1}^y$ ... $w_{p-1,0}^y$, $w_{p-1,1}^y$ ... $w_{p-1,p-1}^y$. As shown in FIG. 2, the neuron 206-0 includes the bias $b_0^y$, the weighting input $z_0^y$, the activation function $a_1$, the neuron 206-1 includes the bias $b_1^y$, the weighting input $z_1^y$, the activation function $a_1$, the neuron 206-($p$–1) includes the bias $b_{p-1}^y$, the weighting input $z_{p-1}^y$, the activation function $a_1$, and so on. The weighting input $z_0^y$ is the weighted sum of the neuron inputs of the third layer 205 based on the weights and the biases, as shown below:

$$z_0^y = w_{00}^y y_0 + w_{10}^y y_1 + \ldots + w_{p-1,0}^y y_{p-1} + b_0^y.$$

The output of the neuron 206-0 is $a_1(z_0^y)$. In this embodiment, $a_1(z_0^y) = \sigma \cdot z_0^y$, where $\sigma$ is defined as previously described. The weighting inputs $z_1^y \ldots z_{p-1}^y$ of the neurons 206-1 through 206-($p$–1) and the outputs of the neurons 206-1 through 206-($p$–1) may be inferred in the same way.

The weights $w_{00}^y$, $w_{01}^y$ ... $w_{0,p-1}^y$, $w_{10}^y$, $w_{11}^y$ ... $w_{1,p-1}^y$ ... $w_{p-1,0}^y$, $w_{p-1,1}^y$ ... $w_{p-1,p-1}^y$ and biases $b_0^y$, $b_1^y$ ... $b_{p-1}^y$ are referred to as second sub parameters, and the connection relationship between the third layer 205 and the fourth layer 206 is referred to as "the third layer 205 and the fourth layer 206 are connected to each other through full connection based on the second sub parameters."

Figure 7:
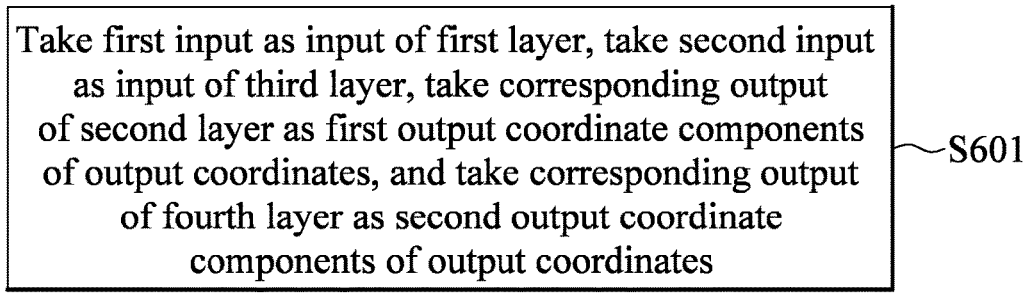
FIG. 7 illustrates a schematic flow chart of a coordinate generation method according to some embodiments of the instant disclosure.

FIG. 7 illustrates a schematic flow chart of a coordinate generation method according to some embodiments of the instant disclosure. Please refer to FIG. 1, FIG. 2 and FIG. 7 at the same time. In the embodiment shown in FIG. 7, the step S503 comprises the step S601. In the step S601, the processing units 101-1 through 101-N take the first input $i_x$ as an input of the first layer 202 and take the second input $i_y$ as an input of the third layer 205. Then, the processing units 101-1 through 101-N obtain outputs of the second layer 203 based on the first input $i_x$ and the first sub parameters $w_{00}^x$, $w_{01}^x$ ... $w_{0,p-1}^x$, $w_{10}^x$, $w_{11}^x$ ... $w_{1,p-1}^x$ ... $w_{p-1,0}^x$, $w_{p-1,1}^x$ ... $w_{p-1,p-1}^x$ and $b_0^x$, $b_1^x$ ... $b_{p-1}^x$, where the outputs of the second layer 203 correspond to the first input $i_x$, and the processing units 101-1 through 101-N obtain outputs of the fourth layer 206 based on the second input $i_y$ and the second sub parameters $w_{00}^y$, $w_{01}^y$ ... $w_{0,p-1}^y$, $w_{10}^y$, $w_{11}^y$ ... $w_{1,p-2}^y$ ... $w_{p-1,0}^y$, $w_{p-1,1}^y$ ... $w_{p-1,p-1}^y$ and $b_0^y$, $b_1^y$ ... $b_{p-1}^y$, wherein the outputs of the fourth layer 206 correspond to the second input $i_y$. The outputs corresponding to the first input $i_x$ and of the second layer 203 are taken as the first components of a plurality of output coordinates, also referred to as the first output coordinate components, and the outputs corresponding to the second input $i_y$ and of the fourth layer 206 are taken as the second components of a plurality of output coordinates, also referred to as the second output coordinate components. Take, for example, the vertex coordinate of the vertex 1041 is (0,0), the vertex coordinate of the vertex 1042 is (0,15), the vertex coordinate of the vertex 1043 is (15,0), the vertex coordinate of the vertex 1044 is (15,15), and the image 104 has 16×16=256 points, and thus p=256 in this example. Therefore, in this embodiment, the processing units 101-1 through 101-N will obtain 256 output coordinates through the neural network module 102. In this embodiment, the first component of the first output coordinate of the 256 output coordinates is the output of the neuron 203-0, the second component of the first output coordinate of the 256 output coordinates is the output of the neuron 206-0, the first component of the second output coordinate of the 256 output coordinates is the output of the neuron 203-1, the second component of the second output coordinate of the 256 output coordinates is the output of the neuron 206-1, and so on. For example, if the output of the neuron 203-1 is 0 and the output of the neuron 206-1 is 1, the second output coordinate of the 256 output coordinates is (0,1). Accordingly, the outputs of the neurons 203-0 through 203-($p$–1) and the outputs of the neurons 206-0 through 206-($p$–1) yield 256 output coordinates. The 256 output coordinates are the coordinates of the points of the image 104.

Let the output of the neuron 203-0 be $o_{x_0}$, the output of the neuron 203-1 be $o_{x_1}$, ..., the output of the neuron 203-($p$–1) be $o_{x_{p-1}}$, the output of the neuron 206-0 be $o_{y_0}$, the output of the neuron 206-1 be $o_{y_1}$, ..., the output of the neuron 206-($p$–1) be $o_{y_{p-1}}$, and then the relationship among the first input $i_x$, the first sub parameters $w_{00}^x$, $w_{01}^x$ ... $w_{0,p-1}^x$, $w_{10}^x$, $w_{11}^x$ ... $w_{1,p-1}^x$ ... $w_{p-1,0}^x$, $w_{p-1,1}^x$ ... $w_{p-1,p-1}^x$, and $b_0^x$, $b_1^x$ ... $b_{p-1}^x$, the second input $i_y$, and the second sub parameters $w_{00}^y$, $w_{01}^y$ ... $w_{0,p-1}^y$, $w_{10}^y$, $w_{11}^y$ ...

$w_{1,p-1}{}^y \ldots w_{p-1,0}{}^y, w_{p-1,1}{}^y \ldots w_{p-1,p-1}{}^y$, and $b_0{}^y, b_1{}^y \ldots b_{p-1}{}^y$ can be presented using the following matrix equations:

$$\begin{bmatrix} o_{x_0} \\ \vdots \\ o_{x_{p-1}} \end{bmatrix} = \sigma \cdot \begin{bmatrix} w_{00}^x & \cdots & w_{p-1,0}^x \\ \vdots & \ddots & \vdots \\ w_{0,p-1}^x & \cdots & w_{p-1,p-1}^x \end{bmatrix} i_x + \begin{bmatrix} b_0^x \\ \vdots \\ b_{p-1}^x \end{bmatrix} \quad \text{(equation 1)}$$

$$\begin{bmatrix} o_{y_0} \\ \vdots \\ o_{y_{p-1}} \end{bmatrix} = \sigma \cdot \begin{bmatrix} w_{00}^y & \cdots & w_{p-1,0}^y \\ \vdots & \ddots & \vdots \\ w_{0,p-1}^y & \cdots & w_{p-1,p-1}^y \end{bmatrix} i_y + \begin{bmatrix} b_0^y \\ \vdots \\ b_{p-1}^y \end{bmatrix} \quad \text{(equation 2)}$$

Figure 3:
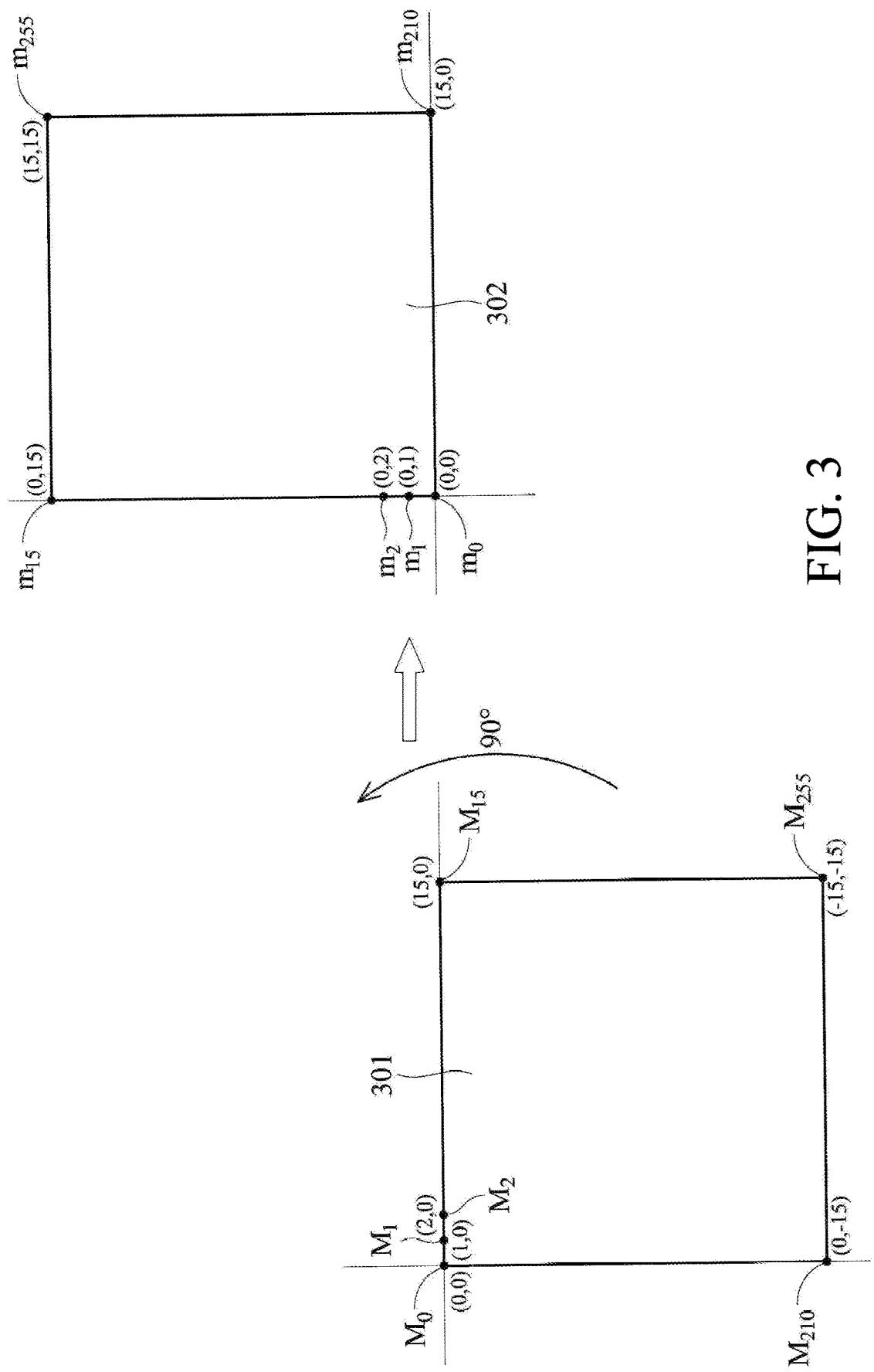
FIG. 3 illustrates a schematic diagram showing the relationship between a target image and an original image according to an embodiment of the instant disclosure.
Figure 8:
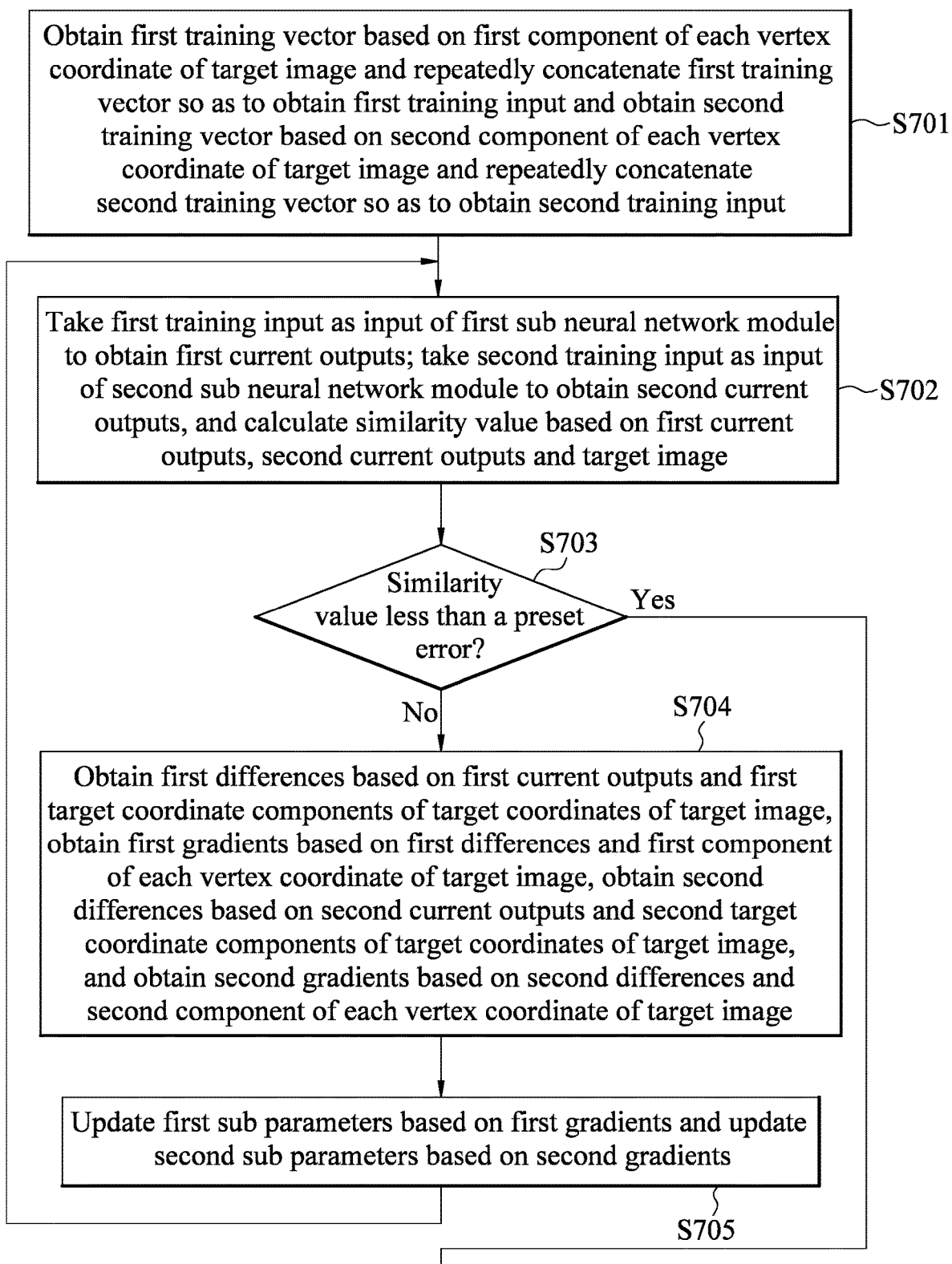
FIG. 8 illustrates a schematic flow chart of the training of a neural network according to some embodiments of the instant disclosure.

As previously illustrated, the parameters 103 are obtained through a training process. The following will further illustrate, with the aid of provided drawings, how the parameters 103 are obtained. FIG. 3 illustrates a schematic diagram showing the relationship between a target image and an original image according to an embodiment of the instant disclosure. FIG. 8 illustrates a schematic flow chart of the training of a neural network according to some embodiments of the instant disclosure. Please refer to FIG. 1, FIG. 2, FIG. 3, and FIG. 8 at the same time. In the embodiment shown in FIG. 8, when the training process is performed, the processing units 101-1 through 101-N first obtain an original image, and the processing units 101-1 through 101-N then transform the original image according to the training goal of the neural network module 102 so as to obtain the target image.

In some embodiments of the instant disclosure, the transformation is a counterclockwise rotation by a preset angle. In some embodiments of the instant disclosure, the transformation is a perspective transformation. Take FIG. 3 as an example. FIG. 3 illustrates a schematic diagram of the transformation being a counterclockwise rotation by 90°. The processing units 101-1 through 101-N first obtain the original image 301 and then obtain the coordinates of the points of the original image 301 based on the locations of the points of the original image 301, where the original image 301 has 16×16=256 points. For example, the coordinate of the point $M_0$ is (0,0), the coordinate of the point $M_1$ is (1,0), the coordinate of the point $M_2$ is (2,0), the coordinate of point the $M_{15}$ is (15,0), the coordinate of the point $M_{210}$ is (0,−15), and the coordinate of point the $M_{255}$ is (−15,−15). The processing units 101-1 through 101-N then rotate the original image 301 counterclockwise by 90° according to the training goal of the neural network module 102 so as to obtain the target image 302 and the coordinates of the points of the target image 302, where the target image 302 has 16×16=256 points. The coordinates of the points of the target image 302 are referred to as the target coordinates. In the embodiment shown in FIG. 3, the coordinate of the point $m_0$ is (0,0), the coordinate of the point $m_1$ is (0,1), the coordinate of the point $m_2$ is (0,2), the coordinate of the point $m_{15}$ is (0,15), the coordinate of the point $m_{210}$ is (15,0), and the coordinate of the point $m_{255}$ is (15,15). Besides, under this transformation (the counterclockwise rotation by 90°), the points of the target image 302 correspond to the points of the original image 301. For example, in this embodiment, the point $m_0$ corresponds to the point $M_0$, the point $m_1$ corresponds to the point $M_1$, the point $m_2$ corresponds to the point $M_2$, the point $m_{15}$ corresponds to the point $M_{15}$, the point $m_{210}$ corresponds to the point $M_{210}$, and the point $m_{255}$ corresponds to the point $M_{255}$.

Figure 4:
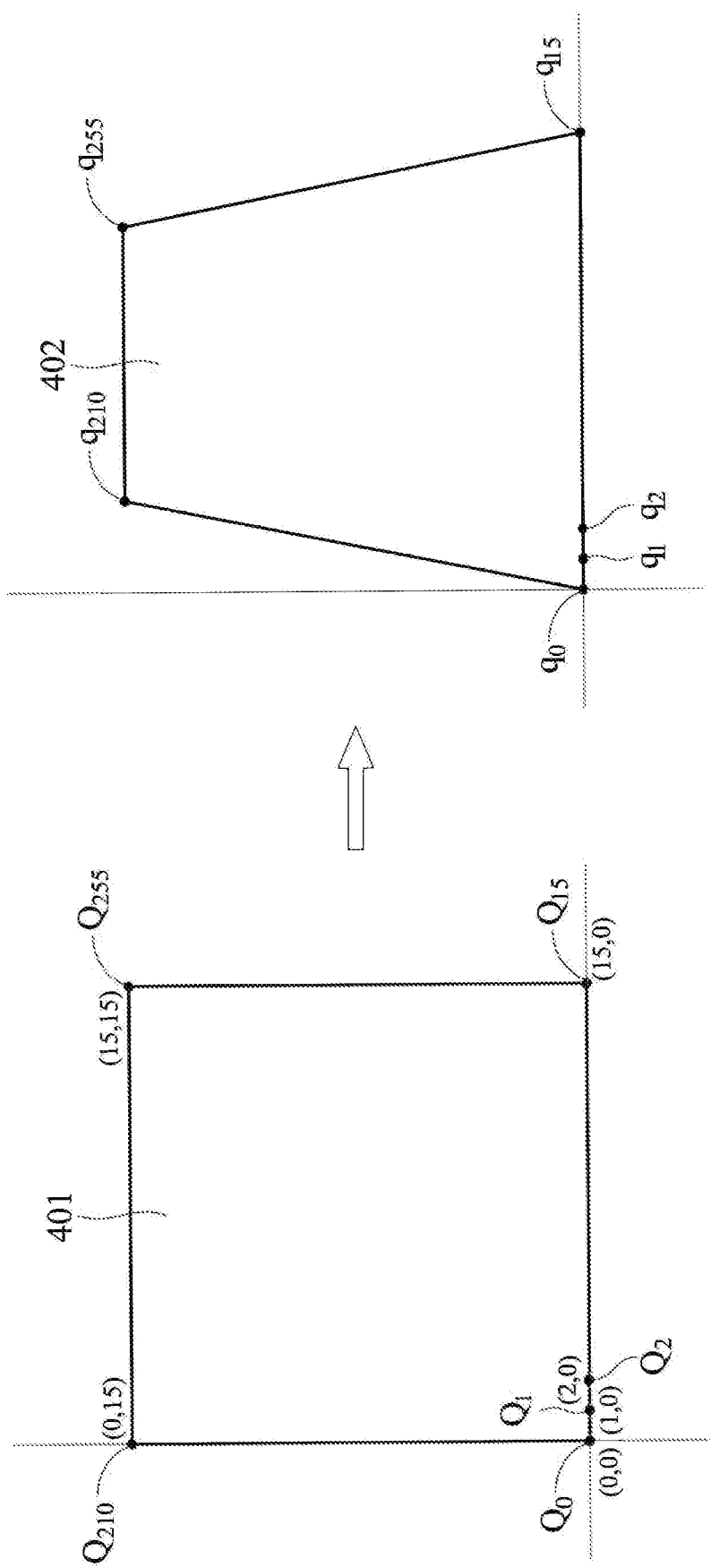
FIG. 4 illustrates a schematic diagram showing the relationship between a target image and an original image according to an embodiment of the instant disclosure.

FIG. 4 illustrates a schematic diagram showing the relationship between a target image and an original image according to an embodiment of the instant disclosure. In some embodiments of the instant disclosure, the transformation is a perspective transformation. Take FIG. 4 as an example. FIG. 4 illustrates a schematic diagram of the transformation being a perspective transformation. The processing units 101-1 through 101-N first obtain the original image 401 and then obtain the coordinates of the points of the original image 401 based on the locations of the points of the original image 401. For example, the coordinate of the point $Q_0$ is (0,0), the coordinate of the point $Q_1$ is (1,0), the coordinate of the point $Q_2$ is (2,0), the coordinate of the point $Q_{15}$ is (15,0), the coordinate of the point $Q_{210}$ is (0,15), and the coordinate of the point $Q_{255}$ is (15,15). The processing units 101-1 through 101-N then perform perspective transformation on the original image 401 according to the training goal of the neural network module 102 so as to obtain the target image 402 and the coordinates of the points of the target image 402. The coordinates of the points of the target image 402 are referred to as the target coordinates. Besides, under this transformation (the perspective transformation), the points of the target image 402 correspond to the points of the original image 401. For example, in this embodiment, the point $q_0$ corresponds to the point $Q_0$, the point $q_1$ corresponds to the point $Q_1$, the point $q_2$ corresponds to the point $Q_2$, the point $q_{15}$ corresponds to the point $Q_{15}$, the point $q_{210}$ corresponds to the point $Q_{210}$, and the point $q_{255}$ corresponds to the point $Q_{255}$.

The following will take FIG. 3 as an example to illustrate the training process of obtaining the parameters 103. In the embodiment shown in FIG. 8, after the processing units 101-1 through 101-N obtain the target image, initial values of the first sub parameters $w_{00}{}^x, w_{01}{}^x \ldots w_{0,p-1}{}^x, w_{10}{}^x, w_{11}{}^x \ldots w_{1,p-1}{}^x \ldots w_{p-1,0}{}^x, w_{p-1,1}{}^x \ldots w_{p-1,p-1}{}^x$, and $b_0{}^x, b_1{}^x \ldots b_{p-1}{}^x$ and initial values of the second sub parameters $w_{00}{}^y, w_{01}{}^y \ldots w_{0,p-1}{}^y, w_{10}{}^y, w_{11}{}^y \ldots w_{1,p-1}{}^y \ldots w_{p-1,0}{}^y, w_{p-1,1}{}^y \ldots w_{p-1,p-1}{}^y$, and $b_0{}^y, b_1{}^y \ldots b_{p-1}{}^y$ are first given. The processing units 101-1 through 101-N then perform the step S701 through the step S705.

It is worth illustrating that, in some embodiments of the instant disclosure, the processing units 101-1 through 101-N randomly set the initial values of the first sub parameters $w_{00}{}^x, w_{01}{}^x \ldots w_{0,p-1}{}^x, w_{10}{}^x, w_{11}{}^x \ldots w_{1,p-1}{}^x \ldots w_{p-1,0}{}^x, w_{p-1,1}{}^x \ldots w_{p-1,p-1}{}^x$, and $b_0{}^x, b_1{}^x \ldots b_{p-1}{}^x$ and the initial values of the second sub parameters $w_{00}{}^y, w_{01}{}^y \ldots w_{0,p-1}{}^y, w_{10}{}^y, w_{11}{}^y \ldots w_{1,p-1}{}^y \ldots w_{p-1,0}{}^y, w_{p-1,1}{}^y \ldots w_{p-1,p-1}{}^y$, and $b_0{}^y, b_1{}^y \ldots b_{p-1}{}^y$ based on a probability distribution (such as normal distribution). The processing units 101-1 through 101-N may utilize software provided by general program languages so as to simulate a random function, such as the random( ) function of the random module in Python, to randomly set the initial values of the first sub parameters and the initial values of the second sub parameters.

In the step S701, the processing units 101-1 through 101-N obtain a first training vector $t_{k_x}$ based on the first component of each of the vertex coordinates of the four vertexes (the point $m_0$, the point $m_{15}$, the point $m_{210}$ and the point $m_{255}$) of the target image 302 and then repeatedly concatenate the first training vector $t_{k_x}$ so as to obtain a first training input $t_{i_x}$, where the number of components of the first training vector $t_{k_x}$ is the number of the points of the target image 302. Take, for example, in FIG. 3, the first training vector $t_{k_x}$ is (0,0,15,15), and the first training input $t_{i_x}$ is $(t_{k_x}, t_{k_x}, \ldots, t_{k_x})$.

The processing units 101-1 through 101-N obtain a second training vector $t_{k_y}$ based on the second component of each of the vertex coordinates of the four vertexes (the point $m_0$, the point $m_{15}$, the point $m_{210}$ and the point mess) of the target image 302 and then repeatedly concatenate the second training vector $t_{k_y}$ so as to obtain a second training input $t_{i_y}$, where the number of components of the second training vector $t_{k_y}$ is the number of the points of the target image 302. Take, for example, in FIG. 3, the second training vector $t_{k_y}$ is (0,15,0,15), and the second training input by is $(t_{k_y}, t_{k_y}, \ldots, t_{k_y})$.

In the step S702, the processing units 101-1 through 101-N take the first training input $t_{i_x}$ as an input of the first sub neural network module 201, and the processing units 101-1 through 101-N obtain a plurality of first current outputs of the second layer 203 based on the first training input $t_{i_x}$ and the initial values of the first sub parameters $w_{00}^x$, $w_{01}^x \ldots w_{0,p-1}^x$, $w_{10}^x$, $w_{11}^x \ldots w_{1,p-1}^x \ldots w_{p-1,0}^x$, $w_{p-1,1}^x \ldots w_{p-1,p-1}^x$ and $b_0^x, b_1^x \ldots b_{p-1}^x$, where the first current outputs correspond to the first training input $t_{i_x}$. The processing units 101-1 through 101-N take the second training input by as an input of the second sub neural network module 204, and the processing units 101-1 through 101-N obtain a plurality of second current outputs of the fourth layer 206 based on the second training input $t_{i_y}$ and the initial values of the second sub parameters $w_{00}^y$, $w_{01}^y \ldots w_{0,p-1}^y, w_{10}^y, w_{11}^y \ldots w_{1,p-1}^y \ldots w_{p-1,0}^y, w_{p-1,1}^y \ldots w_{p-1,p-1}^y$ and $b_0^y, b_1^y \ldots b_{p-1}^y$, where the second current outputs correspond to the second training input $t_{i_y}$. The processing units 101-1 through 101-N calculate a similarity value based on the first current outputs, the second current outputs, and the target image 302, and the similarity value is used to evaluate the similarity between the target image 302 and the points obtained using the first current outputs and the second current outputs. The less the similarity value is, the higher the similarity between the target image 302 and the points obtained using the first current outputs and the second current outputs is.

In the step S703, the processing units 101-1 through 101-N determine whether the similarity value is less than a preset error. If the similarity value is less than the preset error, the processing units 101-1 through 101-N end the training process; if the similarity value is not less than the preset error, the processing units 101-1 through 101-N perform the step S704. The preset error is theoretically 0; however, because the computer by nature presents the floating point number with error, in this embodiment, the preset error is a preset and very small positive floating point number.

In the step S704, the first components of the target coordinates of the target image 302 are referred to as first target coordinate components. The processing units 101-1 through 101-N obtain a plurality of first differences based on the first current outputs and the first target coordinate components of the target coordinates of the target image. For example, in an embodiment, the current output of the neuron 203-1 corresponding to the first training input $t_{i_x}$ is 0.7, the target coordinate of the target image 302 corresponding to the neuron 203-1 is the coordinate of the point $m_1$, the coordinate of the point $m_1$ is (0,1), the first component of the coordinate of the point $m_1$ is 0, and thus the first difference corresponding to the neuron 203-1 is 0.7−0=0.7. Accordingly, the first differences corresponding to of all the neurons of the second layer 203 can be obtained. The processing units 101-1 through 101-N then obtain a plurality of first gradients based on the first differences and the first components of the four vertex coordinates of the target image.

Similarly, the second components of the target coordinates of the target image 302 are referred to as second target coordinate components. The processing units 101-1 through 101-N obtain a plurality of second differences based on the second current outputs and the second target coordinate components of the target coordinates of the target image. For example, in an embodiment, the current output of the neuron 206-1 corresponding to the second training input $t_{i_y}$ is 0.1, the target coordinate of the target image 302 corresponding to the neuron 206-1 is the coordinate of the point $m_1$, the coordinate of the point $m_1$ is (0,1), the second component of the coordinate of the point $m_1$ is 1, and thus the second difference corresponding to the neuron 206-1 is 0.1−1=−0.9. Accordingly, the second differences corresponding to of all the neurons of the fourth layer 206 can be obtained. The processing units 101-1 through 101-N then obtain a plurality of second gradients based on the second differences and the second components of the four vertex coordinates of the target image.

The following Table I and Table II show the correspondence of parameters and vertex coordinate components in some embodiments of the instant disclosure. Please refer to Table I and Table II.

TABLE I

| $w_{0n}^x$ | $w_{1n}^x$ | $w_{2n}^x$ | $w_{3n}^x$ | $w_{4n}^x$ | ... | $w_{p-1,n}^x$ |
|---|---|---|---|---|---|---|
| $k_x[0]$ | $k_x[1]$ | $k_x[2]$ | $k_x[3]$ | $k_x[0]$ | ... | $k_x[3]$ |

TABLE II

| $w_{0m}^y$ | $w_{1m}^y$ | $w_{2m}^y$ | $w_{3m}^y$ | $w_{4m}^y$ | ... | $w_{p-1,m}^y$ |
|---|---|---|---|---|---|---|
| $k_y[0]$ | $k_y[1]$ | $k_y[2]$ | $k_y[3]$ | $k_y[0]$ | ... | $k_y[3]$ |

In Table I and Table II, m and n are both numbers ranging from 0 to p−1, $k_x[i]$ denotes the $i^{th}$ component of the first vector $k_x$, $k_y[j]$ denotes the $j^{th}$ component of the second vector $k_y$, the components of $k_x$ cyclically correspond to the weights of the connection between the neurons of the first layer 202 and the neurons of the second layer 203, and the components of $k_y$ cyclically correspond to the weights of the connection between the neurons of the third layer 205 and the neurons of the fourth layer 206. This corresponding relationship is identical to the relationship between the weights of the connections between the neurons of the first layer 202 and the neurons of the second layer 203 and the components of $k_x$ that are correspondingly multiplied to the weights of the connections in the matrix multiplication in Equation 1 and identical to the relationship between the weights of the connections between the neurons of the third layer 205 and the neurons of the fourth layer 206 and the components of $k_y$ that are correspondingly multiplied to the weights of the connections in the matrix multiplication in Equation 2. Besides, in this embodiment, FIG. 3 is taken as the example, and thus p=256, $k_x[0]=0$, $k_x[1]=0$, $k_x[2]=15$, $k_x[3]=15$, $k_y[0]=0$, $k_y[1]=15$, $k_y[2]=0$, and $k_y[3]=15$.

In some embodiments of the instant disclosure, the processing units 101-1 through 101-N obtain a plurality of first gradients based on the first differences, the first components of the four vertex coordinates of the target image, and the correspondence relationships shown in Table I and Table II according to the following steps:

(ax) for $w_{t,n}^x$, selecting a $k_x[r]$ corresponding to $w_{t,n}^x$ from Table I;

(bx) the first gradient $gradient_{t,n}^x$ corresponding to $w_{t,n}^x$ is $gradient_{t,n}^x = \rho \cdot k_x[r] \cdot$ (corresponding first difference), where $\rho$ is a preset constant; and (cx) the first gradient $gradient_q^x$ corresponding to $b_q^x$ is $gradient_q^x = \rho \cdot$ (corresponding first difference), where t and q are both numbers ranging from 0 to p−1, and r is a number ranging from 0 to 3. For example, when the processing units 101-1 through 101-N calculate the corresponding $w_{3,n}^x$, the processing units 101-1 through 101-N select $k_x[3]$ corresponding to $w_{3,n}^x$ n from Table I. In the embodiment shown in FIG. 3, $k_x[3]=15$.

Similarly, the processing units 101-1 through 101-N then obtain a plurality of second gradients based on the second differences and the second components of the four vertex coordinates of the target image according to the following steps:

(ay) for $w_{t,m}^y$, selecting a $k_y[r]$ corresponding to $w_{t,m}^y$ from Table II;

(by) the second gradient $gradient_{t,m}^y$ corresponding to $w_{t,m}^y$ is $gradient_{t,m}^y = \rho \cdot k_y[r] \cdot$(corresponding second difference), where ρ is the aforementioned preset constant; and (cy) the second gradient $gradient_q^y$ corresponding to $b_q^y$ is $gradient_q^y = \rho \cdot$(corresponding second difference), where, as previously illustrated, t and q are both numbers ranging from 0 to p−1, and r is a number ranging from 0 to 3.

It is worth illustrating that, although the above steps take FIG. 3 as the example, the above steps are also applicable to the perspective transformation shown in FIG. 4 and other geometric transformations.

In the step S705, the processing units 101-1 through 101-N update the first sub parameters based on the first gradients and update the second sub parameters based on the second gradients. In some embodiments of the instant disclosure, the processing units 101-1 through 101-N update the first sub parameters and update the second sub parameters using the following steps: for $w_{t,n}^x$, $$w_{t,n\_new}^x = w_{t,n\_original}^x - \in_x \cdot gradient_{t,n}^x;$$ (Equation 3)

for $b_q^x$, $$b_{q\_new}^x = b_{q\_original}^x - \in_x \cdot gradient_q^x;$$ (Equation 4)

for $w_{t,m}^y$, $$w_{t,m\_new}^y = w_{t,m\_original}^y - \in_y \cdot gradient_{t,m}^y;$$ (Equation 5)

for $b_y^q$, $$b_{q\_new}^y = b_{q\_original}^y - \in_y \cdot gradient_q^y;$$ (Equation 6)

where $\in_x$ and $\in_y$ are preset constants.

After the step S705, the processing units 101-1 through 101-N return to perform the step S702.

Figure 9:
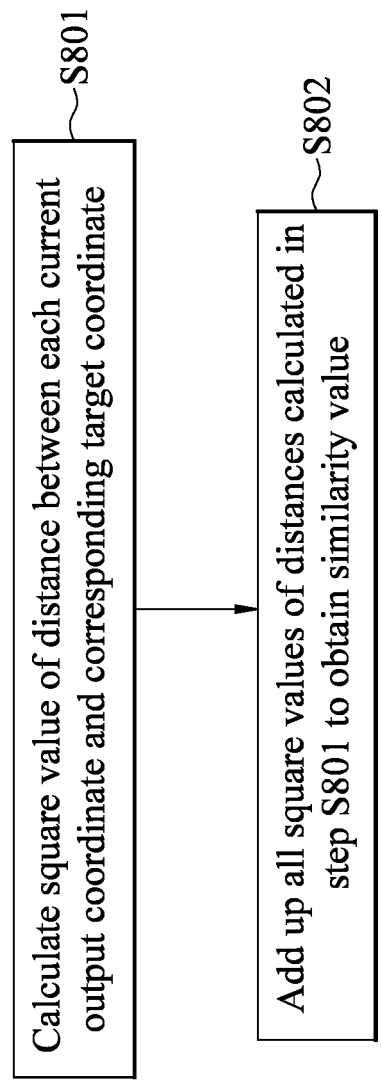
FIG. 9 illustrates a schematic flow chart of the training of a neural network according to some embodiments of the instant disclosure.

FIG. 9 illustrates a schematic flow chart of the training of a neural network according to some embodiments of the instant disclosure. Please refer to FIG. 1 through FIG. 3 and FIG. 8 through FIG. 9 at the same time. The following will take FIG. 3 as an example for illustration. In some embodiments of the instant disclosure, the processing units 101-1 through 101-N perform the steps S801-S802 so as to obtain the similarity value. In the step S801, the processing units 101-1 through 101-N form a plurality of current output coordinates using the first current outputs and the second current outputs according to a sequence of the neurons of the second layer 203 and the sequence of the neurons of the fourth layer 206. In other words, in this embodiment, the processing units 101-1 through 101-N take the first current outputs as the first components of the current output coordinates and take the second current outputs as the second components of the current output coordinates according to the sequence of the neurons of the second layer 203 and the sequence of the neurons of the fourth layer 206. For example, if the first current output of the neuron 203-1 is 0.7 and the second current output of the neuron 206-1 is 0.1, the current output coordinate corresponding to the neuron 203-1 and the neuron 206-1 is (0.7,0.1). Accordingly, a total of p current output coordinates can be obtained (in the embodiment shown in FIG. 3, p=256). Then, the processing units 101-1 through 101-N calculate the square value of a distance between the current output coordinate and the corresponding target coordinate in the target image 302 for each of the current output coordinates. This distance may be a Euclidean distance or a distance defined by other methods. Take the Euclidean distance as an example, the current output coordinate corresponding to the neuron 203-1 and the neuron 206-1 is (0.7,0.1), the target coordinate of the current output coordinate corresponding to the neuron 203-1 and the neuron 206-1 is the coordinate of the point $m_1$, and the coordinate of the point $m_1$ is (0,1). Consequently, the square value of the Euclidean distance can be calculated: $(\sqrt{(0.7-0)^2+(0.1-1)^2})^2 = 1.3$. Accordingly, the processing units 101-1 through 101-N can calculate the square values of the distances between all the current output coordinates and corresponding target coordinates in the target image 302.

In the step S802, the processing units 101-1 through 101-N add up all of the square values of the distances calculated in the step S801 to obtain the similarity value.

Figure 5:
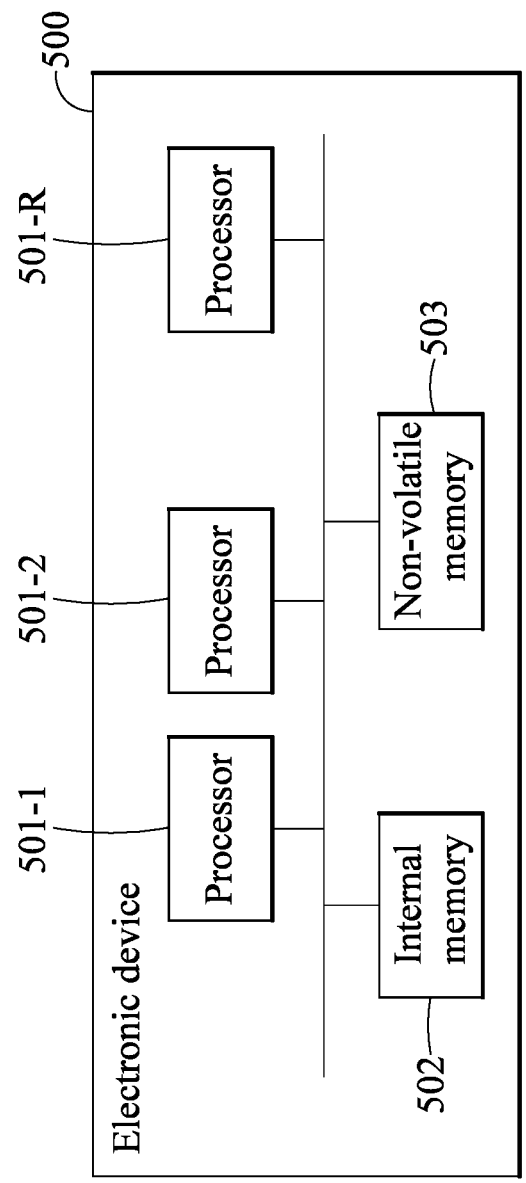
FIG. 5 illustrates a schematic structural diagram of an electronic device according to some embodiments of the instant disclosure.

FIG. 5 illustrates a schematic structural diagram of an electronic device 500 according to some embodiments of the instant disclosure. As shown in FIG. 5, on hardware level, the electronic device 500 comprises processors 501-1 through 501-R, where R is a positive integer, an internal memory 502, and a non-volatile memory 503. The internal memory 502 may for example be a random access memory (RAM). The non-volatile memory 503 may for example be at least one magnetic disk memory. Of course, the electronic device 500 may also include hardware for other functions. The processing units 101-1 through 101-N may be implemented using the processors 501-1 through 501-R.

The internal memory 502 and the non-volatile memory 503 are adapted to store programs. The programs may include codes, and the codes include computer operation instructions. The internal memory 502 and the non-volatile memory 503 provide instructions and data for the processors 501-1 through 501-R. The processors 501-1 through 501-R read corresponding computer programs from the non-volatile memory 503 to the internal memory 502 and then execute the computer programs. In some embodiments, the processors 501-1 through 501-R are specifically used to perform the steps shown in FIG. 6 through FIG. 9. The neural network module 102 may be stored in the internal memory 502 and the non-volatile memory 503 as software or may be implemented using hardware.

The processors 501-1 through 501-R may be in an integrated circuit chip with signal processing capability. During implementation, the methods and steps disclosed in the foregoing embodiments may be achieved by the integrated logic circuit of the hardware in the processors 501-1 through 501-R or software instructions. The processors 501-1 through 501-R may be general purpose processors, such as central processing units (CPUs), tensor processing units, digital signal processors (DSPs), application specific integrated circuits (ASICs), field-programmable gate arrays (FPGAs,) or other programmable logic devices, and the processors 501-1 through 501-R can implement or perform the methods and steps disclosed in the foregoing embodiments.

Some embodiments of the instant disclosure also provide a computer readable storage medium. The computer readable storage medium stores at least one instruction, and when the at least one instruction is executed by the processors 501-1 through 501-R of the electronic device 500, so that the at least one instruction can make the processors 501-1 through 501-R of the electronic device 500 perform the methods and steps disclosed in the foregoing embodiments.

Examples of storage media of a computer include, but are not limited to, a phase-change memory (PRAM), a static random access memory (SRAM), a dynamic random access memory (DRAM), other types of random access memories (RAMs), a read-only memory (ROM), an electrically erasable programmable read-only memory (EEPROM), a flash memory, other internal memory technologies, a compact disc read-only memory (CD-ROM), a digital versatile disc (DVD), other optical storages, a cassette tape, a tape drive, other magnetic storage device, or other non-transmission media, and the storage medium can be used to store information that can be accessed by a computing device. According to the definition in the instant disclosure, the computer readable medium excludes a transitory medium such as modulated data signal and carrier wave.

As above, some embodiments of the instant disclosure provide a coordinate generation system, a coordinate generation method, a computer readable medium with stored program and a non-transitory computer program product. Based on a trained neural network, with just four vertexes of a target image, the coordinates of the other points of the target image can be obtained. Compared with image deformation techniques known to the inventor, which utilizes interpolation to calculate the corresponding coordinates, one or some embodiments of the instant disclosure adopts neural network to replace interpolation, and thus the overall calculation process can be simplified.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A coordinate generation system, comprising:
at least one processing unit configured to obtain four vertex coordinates of an image, wherein each of the four vertex coordinates of the image comprises a first component and a second component; and
a neural network module having a plurality of parameters;
wherein the at least one processing unit is configured to perform the following steps:
(a) obtaining a first vector based on the first component of each of the four vertex coordinates of the image and repeatedly concatenating the first vector so as to obtain a first input and obtaining a second vector based on the second component of each of the four vertex coordinates of the image and repeatedly concatenating the second vector so as to obtain a second input; and
(b) obtaining a plurality of first output coordinate components and a plurality of second output coordinate components of a plurality of output coordinates based on the first input, the second input, and the parameters.

2. The coordinate generation system according to claim 1, wherein the neural network module comprises a first sub neural network module and a second sub neural network module, the parameters comprise a plurality of first sub parameters and a plurality of second sub parameters, the first sub neural network module comprises a first layer and a second layer, the first layer and the second layer are connected to each other through full connection based on the first sub parameters, the second sub neural network module comprises a third layer and a fourth layer, the third layer and the fourth layer are connected to each other through full connection based on the second sub parameters, and the step (b) comprises:
taking the first input as an input of the first layer, taking the second input as an input of the third layer, taking a corresponding output of the second layer as the first output coordinate components of the output coordinates, and taking a corresponding output of the fourth layer as the second output coordinate components of the output coordinates.

3. The coordinate generation system according to claim 2, wherein the first sub parameters and the second sub parameters are obtained by the at least one processing unit based on the following steps during a training period of the neural network module:
(c1) obtaining a first training vector based on a first component of each of four vertex coordinates of a target image and repeatedly concatenating the first training vector so as to obtain a first training input and obtaining a second training vector based on a second component of each of the four vertex coordinates of the target image and repeatedly concatenating the second training vector so as to obtain a second training input;
(c2) taking the first training input as an input of the first sub neural network module to obtain a plurality of first current outputs, taking the second training input as an input of the second sub neural network module to obtain a plurality of second current outputs, and calculating a similarity value based on the first current outputs, the second current outputs and the target image; and
(c3) in response to that the similarity value is not less than a preset error, performing the following steps:
(c31) obtaining a plurality of first differences based on the first current outputs and a plurality of first target coordinate components of a plurality of target coordinates of the target image, obtaining a plurality of first gradients based on the first differences and the first component of each of the four vertex coordinates of the target image, obtaining a plurality of second differences based on the second current outputs and a plurality of second target coordinate components of the target coordinates of the target image, and obtaining a plurality of second gradients based on the second differences and the second component of each of the four vertex coordinates of the target image;
(c32) updating the first sub parameters based on the first gradients and updating the second sub parameters based on the second gradients; and
(c33) performing the steps (c2) and (c3).

4. The coordinate generation system according to claim 3, wherein the first current outputs and the second current outputs form a plurality of current output coordinates, and the similarity value is obtained by the at least one processing unit based on the following steps:
(d1) calculating the square value of a distance between each of the current output coordinates and a corresponding one of the target coordinates; and
(d2) adding up all of the square values of the distances calculated in the step (d1) to obtain the similarity value.

5. The coordinate generation system according to claim 3, wherein the target image is obtained through a transformation of an original image.

6. The coordinate generation system according to claim 5, wherein the transformation is a counterclockwise rotation by a preset angle.

7. The coordinate generation system according to claim 5, wherein the transformation is a perspective transformation.

8. A coordinate generation method, performed by at least one processing unit and comprising:
   (a) obtaining four vertex coordinates of an image, wherein each of the four vertex coordinates of the image comprises a first component and a second component;
   (b) obtaining a first vector based on the first component of each of the four vertex coordinates of the image and repeatedly concatenating the first vector so as to obtain a first input and obtaining a second vector based on the second component of each of the four vertex coordinates of the image and repeatedly concatenating the second vector so as to obtain a second input; and
   (c) obtaining a plurality of first output coordinate components and a plurality of second output coordinate components of a plurality of output coordinates based on the first input, the second input, and a plurality of parameters of a neural network module.

9. The method according to claim 8, wherein the neural network module comprises a first sub neural network module and a second sub neural network module, the parameters comprise a plurality of first sub parameters and a plurality of second sub parameters, the first sub neural network module comprises a first layer and a second layer, the first layer and the second layer are connected to each other through full connection based on the first sub parameters, the second sub neural network module comprises a third layer and a fourth layer, the third layer and the fourth layer are connected to each other through full connection based on the second sub parameters, and the step (c) comprises:
   taking the first input as an input of the first layer, taking the second input as an input of the third layer, taking the corresponding output of the second layer as the first output coordinate components of the output coordinates, and taking a corresponding output of the fourth layer as the second output coordinate components of the output coordinates.

10. The method according to claim 9, wherein the first sub parameters and the second sub parameters are obtained by the at least one processing unit during a training period of the neural network module based on the following steps:
    (d1) obtaining a first training vector based on a first component of each of four vertex coordinates of a target image and repeatedly concatenating the first training vector so as to obtain a first training input and obtaining a second training vector based on a second component of each of the four vertex coordinates of the target image and repeatedly concatenating the second training vector so as to obtain a second training input;
    (d2) taking the first training input as an input of the first sub neural network module to obtain a plurality of first current outputs; taking the second training input as an input of the second sub neural network module to obtain a plurality of second current outputs, and calculating a similarity value based on the first current outputs, the second current outputs and the target image; and
    (d3) in response to that the similarity value is not less than a preset error, performing the following steps:
    (d31) obtaining a plurality of first differences based on the first current outputs and a plurality of first target coordinate components of a plurality of target coordinates of the target image, obtaining a plurality of first gradients based on the first differences and the first component of each of the four vertex coordinates of the target image, obtaining a plurality of second differences based on the second current outputs and a plurality of second target coordinate components of the target coordinates of the target image, and obtaining a plurality of second gradients based on the second differences and the second component of each of the four vertex coordinates of the target image;
    (d32) updating the first sub parameters based on the first gradients and updating the second sub parameters based on the second gradients; and
    (d33) performing the steps (d2) and (d3).

11. The method according to claim 10, wherein the first current outputs and the second current outputs form a plurality of current output coordinates, and the similarity value is obtained by the at least one processing unit based on the following steps:
    (e1) calculating the square value of a distance between each of the current output coordinates and a corresponding one of the target coordinates; and
    (e2) adding up all of the square values of the distances calculated in the step (e1) to obtain the similarity value.

12. The method according to claim 10, wherein the target image is obtained through a transformation of an original image.

13. The method according to claim 8, wherein the transformation is a counterclockwise rotation by a preset angle.

14. The method according to claim 8, wherein the transformation is a perspective transformation.

15. A non-transitory computer readable recording medium with a stored program, wherein, when at least one processor loads and executes the stored program, the at least one processor executes the method according to claim 8.

* * * * *